Feb. 24, 1942.  M. L. NICOL  2,274,499
BIRTHDAY CAKE AND CANDLE SUPPORT
Filed Nov. 28, 1939
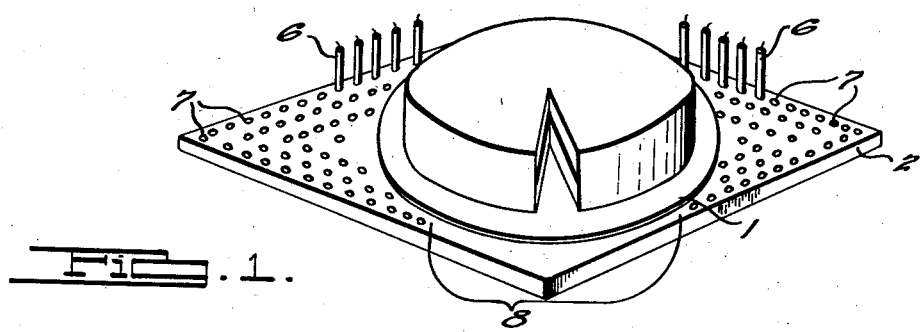
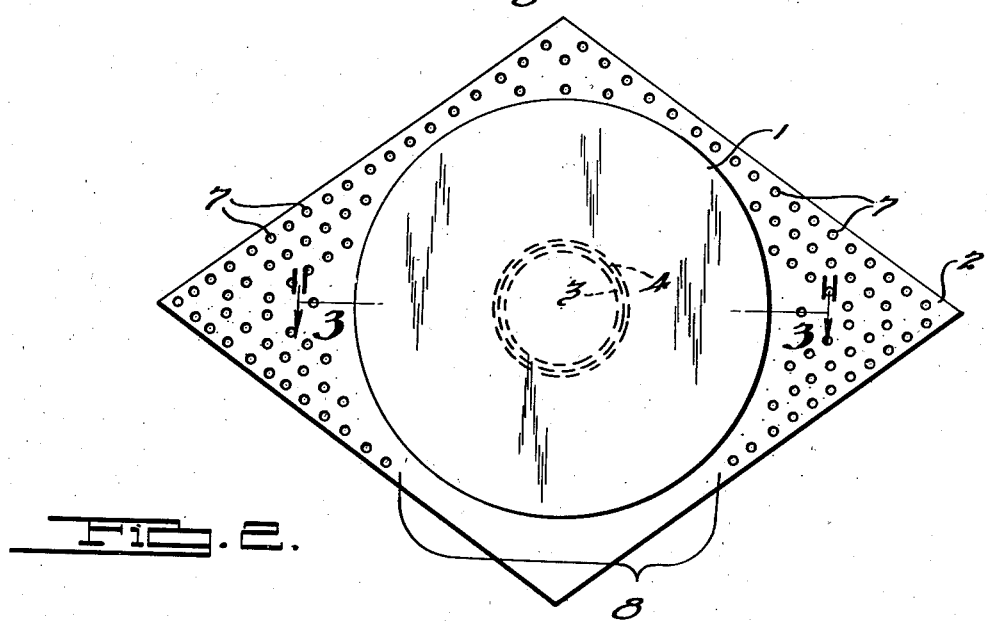
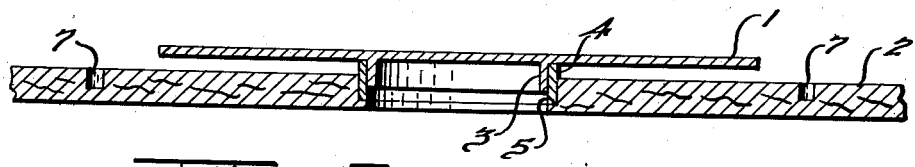
INVENTOR
Mary Lixey Nicol.
BY
Harness, Dickey & Pierce.
ATTORNEYS Patented Feb. 24, 1942

2,274,499

UNITED STATES PATENT OFFICE 2,274,499

BIRTHDAY CAKE AND CANDLE SUPPORT

Mary Lixey Nicol, Detroit, Mich.

Application November 28, 1939, Serial No. 306,585

3 Claims. (Cl. 65—61)

The present invention relates to a birthday cake and candle supporting board.

It is common to cover cakes with icing and to place fanciful decorative effects thereon by the use of various colored icings and/or nuts, etc. It is also common to use candles in connection with birthday cakes, and to place them in supports which are stuck into the cake. This procedure has several disadvantages. The insertion into, and the extraction from the cake, of the candle supports, disorders and tears apart the icing and the decorative effects referred to above if any are present. This practice also permits drippings of the candle to fall upon the cake.

It has been suggested that a cake support may have a margin surrounding the cake, with openings in said margin for supporting candles. This, however, does not obviate the necessity of extinguishing and removing the candles before the cake may be readily cut, nor the necessity of turning the entire cake supporting device to facilitate the cutting of the cake.

Accordingly, it is an object of the present invention to provide means for supporting the cake and candles in such a manner that the cake may be readily cut and cut pieces of the cake removed, without extinguishing or removing the candles.

Other objects of the invention will become apparent from the following specification, the accompanying drawing, and the claims hereinafter set forth.

In the accompanying drawing which illustrates the preferred embodiment of the present invention, and in which like numerals refer to like parts throughout the several views:

Figure 1 is a perspective view of an embodiment of the invention with a cake and a few of the candles in position;

Figure 2 is a plan view of the same embodiment; and

Figure 3 is a cross section taken at line A—A of Figure 2.

Referring to the drawing, the cake supporting device comprises a rotatable cake plate 1, which may be made of metal or any other suitable material, pivotally mounted by any suitable means upon a board 2, which may be made of wood or any other suitable material, in combination with means for supporting candles around the major portion of the periphery of the cake, as hereinafter described.

The means for pivotally mounting the plate 1 on board 2 comprises a cylindrical flange 3, extending vertically downward from the under side of the cake plate 1, and fitting within a vertically disposed ring 4 which may also be made of metal or any other suitable material. The ring 4 is mounted in a counter-sunk opening in the center of the board and bears against the shoulder 5 near the bottom of said opening. The ring 3 extends above the upper surface of the board, as shown, so that the plate 1 bears upon the upper surface thereof.

Tilting of the cake plate will be prevented in the embodiment shown by the fairly close fit between the flange 3 and the ring 4, and also by the relatively large diameter of the ring 4.

The candles 6 are supported in the margin surrounding the cake plate 1, by any suitable means, the means in the embodiment shown in the drawing being a plurality of holes 7 extending partially through the board. These holes, which may be of any desired number, are so arranged about the board as to leave a gap 8, through which the cake may be cut, and the cut pieces of cake removed without disturbing the candles.

Formal changes may be made in the specific embodiment of the invention described without departing from the spirit and substance of the invention, the scope of which is commensurate with the appended claims.

What is claimed is:

1. In combination, a supporting member, a cake plate rotatably mounted on and above said member, said member projecting outwardly beyond the periphery of the plate and formed with a plurality of sockets to which candles are adapted to be fixed about and outwardly of the periphery of the plate.

2. In combination, a supporting member, a cake plate rotatably mounted on and above said member, said member projecting outwardly beyond the periphery of the plate and having a plurality of candle receiving sockets formed therein around and outwardly of the periphery of the plate.

3. In combination, a supporting member, a cake plate rotatably mounted on and above said member, said member projecting outwardly beyond the periphery of the plate and being provided with a plurarilty of candle receiving sockets fixed with respect to the support around and outwardly of the periphery of the plate, said candle receiving sockets extending less than entirely around said plate so as to leave a gap between the candles at one side of the plate through which the cake may be cut without removing the candles.

MARY LIXEY NICOL.